United States Patent [19]

Seaver

[11] Patent Number: 4,749,254

[45] Date of Patent: Jun. 7, 1988

[54] OPTICAL SENSOR SYSTEM

[76] Inventor: George A. Seaver, Box 401, Cataumet, Mass. 02534

[21] Appl. No.: 719,346

[22] Filed: Apr. 3, 1985

[51] Int. Cl.⁴ .......................... G02B 6/02; G01H 9/00
[52] U.S. Cl. ............................. 350/96.29; 350/96.16; 350/96.19; 367/141; 370/3; 73/170 A; 73/866.5
[58] Field of Search ............... 350/96.15, 96.16, 96.19, 350/96.29, 96.30; 367/140–149; 370/3, 4; 73/655, 800, 170 A, 866.5

[56] References Cited

U.S. PATENT DOCUMENTS

| | | | |
|---|---|---|---|
| 4,136,566 | 1/1979 | Christensen | 374/161 |
| 4,267,590 | 5/1981 | Bosotti | 370/3 |
| 4,306,805 | 12/1981 | Arrington | 356/133 |
| 4,372,165 | 2/1983 | Pitt et al. | 73/861.22 |
| 4,410,020 | 10/1983 | Lorenz | 350/96.20 X |
| 4,427,293 | 1/1984 | Harmer | 356/133 |
| 4,432,599 | 2/1984 | McMahon | 350/96.15 |
| 4,525,818 | 6/1985 | Cielo et al. | 367/149 |

FOREIGN PATENT DOCUMENTS 52-20889  2/1977  Japan.
57-64708  4/1982  Japan .............................. 350/96.15

OTHER PUBLICATIONS

Meyer–Arendt, J. R. "Intro. to Classical and Modern Optics," Englewood Cliffs, N.J., Prentice Hall, Inc., 1972, pp. 471–483.
"Variable Angle Reflection Attachment for the Ultraviolet, Visible, and Infrared" Hansen, *Analytical Chemistry*, vol. 37, #9, pp. 1142–1145, 8/1965.
"A Method of Measurement of the Pitch and Refractive Indices of Cholesteric Liquid Crystals Using Selective Reflections and Total Reflections" Tako et al., *Japanese Journal of Applied Physics*, vol. 14-1, pp. 425 thru 428; 1975.

Primary Examiner—John Lee
Attorney, Agent, or Firm—Blodgett & Blodgett

[57] ABSTRACT

Present electrical expendable oceanographic instruments are vulnerable to insulation leaks and electromagnetic interference; they are also unable to measure pressure and the index of refraction. In response to these difficulties a unique combination of optical temperature, pressure, and index of refraction sensors have been developed. These sensors are coupled to an optical fiber transmission link which is contained initially within a probe vehicle and is designed to be unreeled. The remote sensing feature of this combination and technique makes the instrument also suitable for industrial and data - and tele-communications use. The principle of the three sensors is that of optical filters, whose band edges are functions of temperature, pressure, and the index of refraction; this wavelength modulation technique avoids drift and allows the signals from the sensors to be wavelength multiplexed in a single optical fiber, and to be read remotely by a single detector.

11 Claims, 2 Drawing Sheets

OPTICAL SENSOR SYSTEM

BACKGROUND OF THE INVENTION

1. Field of the Invention

This invention relates to optical fiber and optical sensors and, more particularly, to a unique combination of wavelength modulated optical sensors coupled to a spectrograph detector and an optical fiber transmission link.

2. The Prior Art (The citations are expanded below)

Conventional oceanographic instruments make use of electrical sensors and electrical wires and use a time consuming measurement process. With research vessel time becoming more expensive and difficult to get, the necessity for accurate expendable oceanographic sensors and probes is becoming more apparent. Present expendable technology makes use of electromagnetically active wires and sensors and are produced primarily by Sippican Corporation of Marion, Mass., Magnavox Inc., and Sparton Inc.; the latter two are involved in the manufacture of expendable acoustic hydrophones called sonobuoys. Sippican Corporation has manufactured the expendable bathythermograph since 1965; this is called an XBT and measures the temperature and time as the device falls through the ocean. Time is theoretically related to depth and the information from the thermistor is relayed back to the surface vessel through a thin wire that unreels from the probe vehicle as it falls. This wire breaks when it is unreeled and the measurement is complete; the probe vehicle and sensor then descend to the bottom of the ocean. Sippican also manufactures expendable sound velocimeters (XSV, 1979) that measure the speed of sound and time, expendable current profilers (XCP, 1983) that measure the magnetic field and time, and expendable air launched bathythermographs (AXBT, 1984) that are dropped from aircraft into the ocean; an expendable conductivity, temperature, and depth probe (XCTD, 1985) is now being developed to measure conductivity, temperature, and time. The expendable current profiler was originally developed in a non-expendable form by Sandford and Drever in 1978 at the Woods Hole Oceanographic Institution; also other versions of the expendable air launched bathythermographs are manufactured by Magnavox Inc., and Hermes Inc.

Electrical expendable probes, transmission links, and sensors suffer from the following problems:

1. Depth sensing is intractable,
2. Conductivity, and therefore, salinity measurement is difficult and unreliable,
3. Failure rate is high due to electrical insulation leaks,
4. The thermal sensor time constant is large, and
5. Wire transmission link data rate is low.

The simple design and rugged and electromagnetically passive nature of optical fibers and optical sensors offers solutions in these areas. The present electrical expendable instruments measure time and, assuming a constant free-fall velocity, relate it to depth; this method has an average error of 3½% with an even greater error for the deeper probes. Optical pressure sensors used to measure depth have accuracies generally at 0.4%. Optical index of refraction sensors do not have the drift and instabilities created by the films and polarization encountered in electrical conductivity probes. Also, this electrically passive nature eliminates the failures caused by electrical insulation breaks and the radio frequency pick-up in the probe and transmission link of conventional expendables. The ocean is also an electrical conductor. In the past data from expendable instruments has not been fully trusted by oceanographers except, perhaps, for survey work. Noncatastrophic wire insulation leaks result in signal errors that are not immediately apparent and require elaborate screening procedures for the data to be believed. In regards to the thermal time constant, the absence of electrical insulation covering the thermal sensor offers an improved time response potential over the electrical thermistor. Finally, the optical fiber transmission link is capable of passing 200 megabits/sec of data, enough for a hundred or more sensors, as opposed to the two or three limit imposed by thin electrical wire.

In the past the cost of optical fiber has been prohibitive for its use in expendable probes. Seven years ago its cost was $1.50 per meter; today the retail quote is $0.15/m with wholesale discounts beyond this, and the prospect is for the price to continue to decrease. The manufacturers, such as Corning Glass Works, have stated that the long term goal is to make glass fiber equivalent to copper wire in price.

In addition to the above oceanographic and underwater sensing applications, remote optical sensing has application in industrial process control, cryogenic environments, and in fiber optic data- and tele-communications. Evanescent wave spectroscopy and liquid chromotography are two industrial applications of fiber optic refraction sensors as described by Lew, et. al. (1984) and David et. al. (1976) respectively. The use of optical pressure, temperature, and refraction sensors to avoid electrical hazard in explosive environments is discussed by Sharma and Brooks (1980). Finally, local area data and tele-communication networks are increasingly using optical fibers, and optical pressure, temperature, and liquid level refraction sensors are a needed addition for such purposes as building security as discussed by Harmer (1983).

In surveying the specific optical sensing techniques presently in use, we find that those sensors that use amplitude modulation are not sensitive enough and have drift and calibration problems, whereas other optical sensors that use phase modulation are sensitive to too many factors, particularly in remote applications. Christensen (1979) has developed a band edge semiconductor temperature sensor that is amplitude modulated; the drift is only partly compensated for by using a reference signal, and the instrument must be recalibrated every few hours. Also, Spillman and McMahon (1982) have developed a birefringent pressure sensor which is also amplitude modulated, and Mahrt, et. al. (1982) has developed an in-situ critical angle refractometer that has a wire link return and is not expendable. In regards to phase modulation the Naval Research Laboratory in Washington, D.C. has developed interferometers for optical acoustic pressure sensing in the oceans; they have been able to attain very high sensitivities, but with concomitant environmental noise. This work is reviewed by Giallorenzi, et. al. (1982).

The use of optical fiber as a transmission link in underwater sensing is relatively new, but has had several successful applications. Gregg, et. al. in 1982 made use of the high data rate capability of optical fiber to service six electrical sensors in a free-fall microstructure profiler; Lund beginning in 1983 uses optical fiber for in-situ algae mapping by stimulating and detecting fluorescent emissions; and the Naval Ocean systems Center established the feasibility of using optical fibers for expendable communications links in 1982. A caution to this, however, was added by S. Hanish in 1981 at the Naval Post Graduate School in Monterey; he found that thermal and mechanical stresses produced by the ocean environment created a moderate to severe effect on phase sensing. Remote oceanic interferometric sensing techniques are not currently practical.

Each of the foregoing prior art devices are useful in particular applications. However, it would be an advancement in the art to provide a combination of temperature, pressure, and index of refraction sensors that were accurate and free from drift, that could be used to make measurements in remote and inaccessible locations such as the oceans, and that could even be expendable. Such a unique combination of sensors, detector, and transmission link is disclosed and claimed herein.

REFERENCES CITED ABOVE

I. Expendable Electrical Ocean Sensors (a) Sippican Ocean Systems, Marion, Mass. Expendable Bathythermograph (XBT, 1965); Expendable Sound Velocimeter (XSV, 1979); Expendable Current Profiler (SCP, 1983); Air Launched Expendable Bathythermographs (AXBT, 1984); Expendable Conductivity, Temperature, and Depth (SCTD, 1985). Also "Expendable Air Probe," 1971, Pat. No. 3,569,512 and "Bathythermograph System," 1965 (Buzzards Bay Corp.), Pat. No. 3,221,556.

(b) Interstate Electronics Corporation, Anaheim, Calif. Disposable Underway Bathythermometer (DUBAT, 1965). Contract No. bsr-93315. Final Engineering Report U.S. Navy Bureau of Ships, May 1966.

(c) Sandford, T. and R. Drever, Woods Hole Oceanographic Institution. Deep Sea Research, Vol. 25, 1978 pp 183-210. Expendable Electromagnetic Velocity Profiler (XEMVP, 1982).

(d) Magnavox Inc. Expendable Hydrophones (Sonobouys). Expendable Air Launched Bathythermographs (AXBT, 1984).

(e) Hazeltine Inc., Commack, N.Y. Expendable Hydrophones (Sonobuoys).

(f) Hermes, Inc., Expendable Air Launched Bathythermographs (AXBT, 1984).

(g) Spartan, Inc. Expendable Hydrophones (Sonobuoys).

II. Optical Ocean Sensors (a) Mahrt, K-H., H. C. Waldmann, and W. Kroebel, 1982. "A Remote Index of Refraction Probe". Proceedings of the Oceans '82 Conference, IEEE/MTS, Washington, D.C.

(b) Christensen, D. 1979: "Semiconductor Temperature Sensor". U.S. Pat. No. 4,136,566.

(c) Spillman, W. and D. McMahon, 1982: "Multimode Fiber-Optic Hydrophone based on the Photoclastic Effect". Applied Optics, Vol. 21, No. 19, p. 3511-3514.

(d) Giallorenzi, R., J. Bucaro, A. Dandridge, G. Sigel, J. Cole, S. Rashleigh, and R. Priest, 1982:"Optical Fiber Sensor Technology". IEEE Journal of Quantum Electronics, Vol. QE-18, No. 4, p. 626-665.

III. Optical Industrial Sensors (a) Lew, A., C. Depeursinge, F. Cochet, H. Berthou, and O. Parriaux, 1984: "Single-Mode Fiber Evanesent Wave Spectroscopy". Proceedings of the Second International Conference on Optical Fiber Sensors, VDE-Verlag GmbH Berlin, FRG, September 1984, p. 71.

(b) David, D., D. Shaw, and H. Tucker, 1976: "Design, Development, and Performance of a Fiber Optics Refractometer: Application to HPLC". Review of Scientific Instruments, Vol. 47, No. 9, p. 989.

(c) Sharma, M. and R. Brooks, 1980: "Fiber-optic Sensing in Cryogenic Environments". SPIE Vol. 224, p. 46.

(d) Harmer, A., 1983: "Optical Fiber Sensor Markets". Proceedings of the First International Conference on Optical Fiber Sensors, IEE, London, p. 53.

IV. Optical Fiber Transmission Links for Ocean Sensors (a) Gregg, M., W. Nodlund, E. Aagaard, and D. Hirt, 1982: "Use of a Fiber-Optic Cable with a Free-Fall Microstructure Profiler". Proceedings of the Oceans '82 Conference, IEEE/MTS, 1982.

(b) Lund, T., 1983: "A Fiber Optics Fluorimeter for Algae detection and Mapping". Proceedings of the First International Conference on Optical Fiber Sensors. IEE, Savoy Place, London, England and OSA, Washington, D.C. April 1983.

BRIEF SUMMARY AND OBJECTS OF THE INVENTION

This invention relates to a unique combination of optical sensors, an optical fiber transmission link, and a spectrograph detector. The instrument relies upon the wavelength shift of the band edges of various optical and infrared filters with changes in the temperature, pressure, and index of refraction of the environment. The signals are wavelength multiplexed in a single optical fiber to be read at a remote location. The specific techniques that are used here are the change in wavelength of the absorption/transmission band edge of such materials as selenium with temperature, the change in the wavelength of the multiple transmission band edges of such birefringent materials as quartz with pressure, and the change in wavelength of the reflection/refraction band edge of such prismatic materials as glass with the index of refraction. The three band edge signals are in different parts of the visible-infrared region of the spectrum and are wavelength multiplexed in a single optical fiber that can be several kilometers long. The signals are then detected with a spectrum analyzer and related to the temperature, pressure, and index of refraction at the measurement site. The light sources for the sensors and the optical fiber are located in a probe vehicle or distributed along the detector return fiber and are inexpensive enough to be expendable.

It is, therefore, a primary object of this invention to provide improvements in the optical sensing of temperature, pressure, and index of refraction wherein the operation is drift free.

Another object of this invention is to provide an improved method for sensing temperature, pressure, and the index of refraction in inaccessible locations and at small scales, wherein the sensors are expendable.

Another object of this invention is to provide an improved method for sensing temperature, pressure, and the index of refraction in an electrically conducting fluid or in the presence of an electromagnetic field.

These and other objects and features of the present invention will become more fully apparent from the following description and appended claims taken in conjunction with the accompanying drawings.

DETAILED DESCRIPTION OF THE PREFERRED EMBODIMENTS

Figure 1:
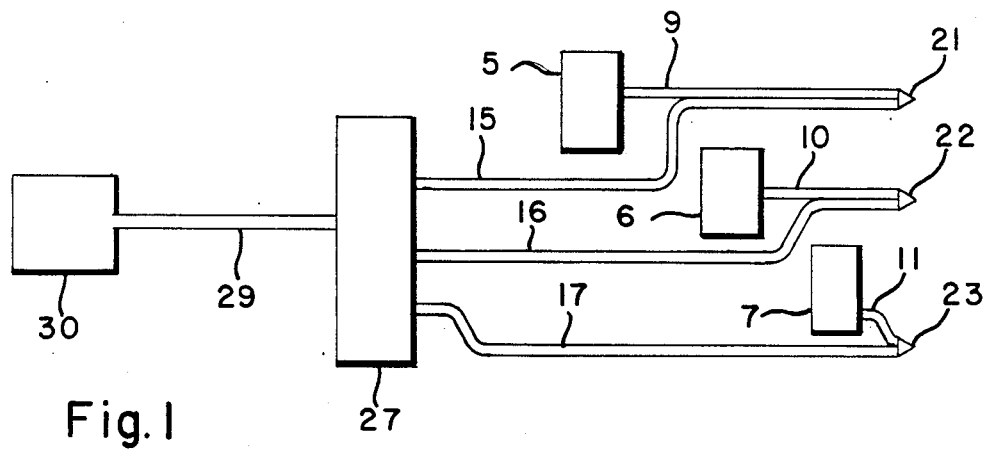
FIG. 1 is a schematic plan view of one presently preferred wavelength multiplexed embodiment of the multiple sensor instrument of this invention.

This invention is best understood by reference to the drawings wherein like parts are designated with like numerals throughout.

In order to avoid the drift associated with present optical sensors it is desirable to have the sensed quantity modulate the wavelength of an optical signal rather than its amplitude; a wavelength resolving detector also allows the wavelength multiplexing of many signals into a single optical fiber. Such a combination is presented in FIG. 1, wherein is shown a schematic of one preferred embodiment of this invention. Individual broad band radiant energy sources 5, 6, and 7 have band widths that are separate from each other and are particularly chosen for the sensors 21, 22, and 23 they are coupled to. The radiant energy path means consists of first optical fiber waveguides 9, 10, and 11 coupling each radiant energy source to each sensor. The first optical fiber waveguide may be a single mode fiber, as for instance in the case of a refraction sensor. The second optical fiber waveguides 15, 16, and 17 couple the sensors to the wavelength division multiplexer 27, and a third optical fiber waveguide means 29 couples the wavelength division multiplexer 27 and all of the sensor signals to the spectrograph detector 30.

The sensing means are radiant energy filters whose band edges occur at different wavelengths from each other and are functions of many parameters, such as the temperature, pressure, and index of refraction external to the sensor. The sensors provide a direct or reflective path from said first waveguide means, through said sensing means, to said second waveguide means. The radiant energy sources and their emission bandwidth are particularly chosen to cover the expected range of variation of the sensor band edge over its sensed parameter range. An illustrative example of this is presented in FIG. 2, wherein the dotted lines represent the spectral intensities of the radiation sources and the solid lines are for the band edge sensors. Finally, the detecting means 30 is optically coupled to the third optical fiber waveguide means 29; with a dispersing prism and/or a diffraction grating the signal is dispersed by the detector in an angular manner in space according to wavelength, said spectral intensities then being detected with suitable photodetectors, such as charge-coupled devices or charge-injection devices. The detector microprocessor then correlates the spectral intensities, and the resulting wavelength of the band edges, with the parameters each band edge is intended to measure. With the present detector technology, wavelengths from 400 nanometers (nm) to 1100 nm can be measured. This would be adequate for a temperature, pressure, and index of refraction sensor combination or for six or more individual temperature sensors using different materials such as Selenium, Gallium Arsenide, and Indium Phosphide.

Figure 3:
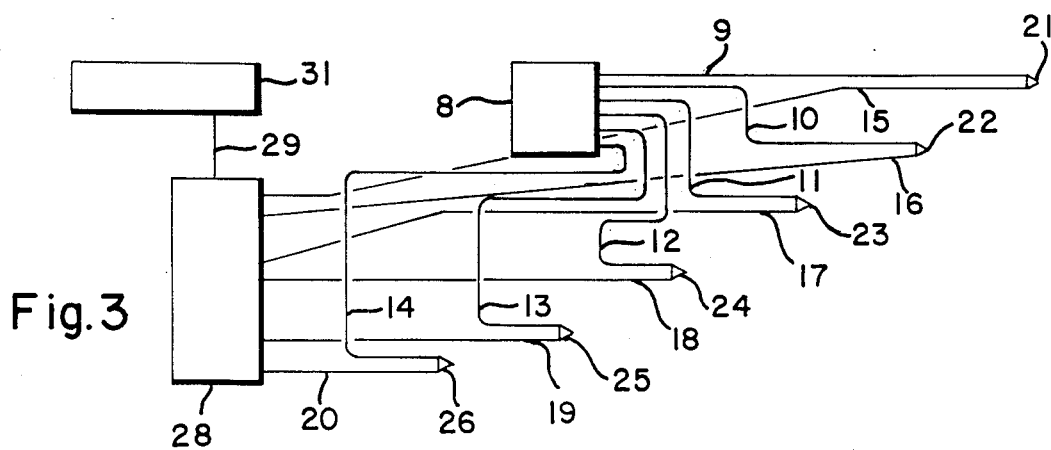
FIG. 3 is a schematic plan view of a second preferred time multiplexed embodiment of the multiple sensor instrument of this invention.

In the general case, to combine more than three sensors into the instrument described herein the technique of time division multiplexing must be used in place of or in addition to wavelength division multiplexing. With the detector remote from the sensors the third waveguide means coupling them is alternately used by the various sensors; with optical fiber the switching between the various sensors can be done very quickly permitting the use of 300 sensors instead of the usual two or three for thin electrical wire. Referring to FIG. 3, wherein this technique is best shown, we see that a single broad-band radiant energy source 8 is used, said source having a band width sufficient to cover the range of the band edges of sensors 21–26. Radiant energy source 8 is optically coupled by the first optical fiber waveguides 9–14 to the sensing means 21–26 and thence to the time division multiplexer 28 via second optical fiber waveguides 15–20. The time division multiplexer alternately couples the sensing means 21 through 26 to the spectrograph detector 31 via the third optical fiber waveguide means 29. The first optical fiber waveguide means 9–14 can be single mode fiber, as for instance with a refraction sensor, and the sensing means can be distributed over an area or distance and in this embodiment can be comprised of many temperature sensors of the same material and band edges. Further, as the sensors are generally composed of a small 45° −90° −45° prismatic material just big enough to sit upon two optical fibers, the outer dimension of each sensor is that of two optical fibers, or 0.6 mm, and can be used in very restricted regions.

The limitation on the number of sensors in the wavelength division multiplexed method of FIG. 1 is imposed by the spectral characteristics of the silicon photodetectors. Use of the newly developed Indium Antinimide (InSb) charge-injection devices or the Platinum Silicide (PtSi) charge-coupled devices will extend the wavelength range out to 3,000 nm and allow many more than three sensors in the embodiment of FIG. 1.

As was mentioned before, the present electrical expendable oceanographic sensors and transmission lines are subject to shorting out in sea water and have a very limited data rate and, therefore, a limited number and type of sensing capabilities and sampling rates. Optical sensors and transmission lines avoid this problem as can be shown by considering FIGS. 1 and 2. We contain the sensing means 21–26 within a probe vehicle; the long third optical fiber waveguide means 29 is also contained within said probe vehicle on a reel. Said third optical fiber waveguide means is further capable of being unreeled during a moving measurement process and then severed upon completion of that mesurement process. Such an application could be from an oceanographic research vessel in which said probe vehicle is dropped over the side of said vessel thereby measuring many parameters during its descent. The optical fiber waveguide 29 upon being fully unreeled is severed simply by the motion of said probe vehicle. The radiant energy sources, the first, second, and third optical fiber waveguide means and multiplexer, and the sensing means are thereby expended along with the probe vehicle.

Up until recently, the cost of optical fiber has prevented its use in expendable instruments; it is presently five to six times the cost of expendable wire. However, optical fiber expendables will become cost competitive and then cheaper than electrical expendables due to three emerging factors: the cost of optical fiber has diminished by a factor of 10 in the last 8 years and Corning Glass Works has stated that it desires to make fiber equivalent to wire in price; the volume usage if optical fiber replaces wire in expendable oceanographic instruments would double the present total annual optical fiber production in the U.S.; and the strength, bandwidth and attenuation requirements of expendable fiber are significantly less than those for telecommunications optical fiber.

Figure 4:
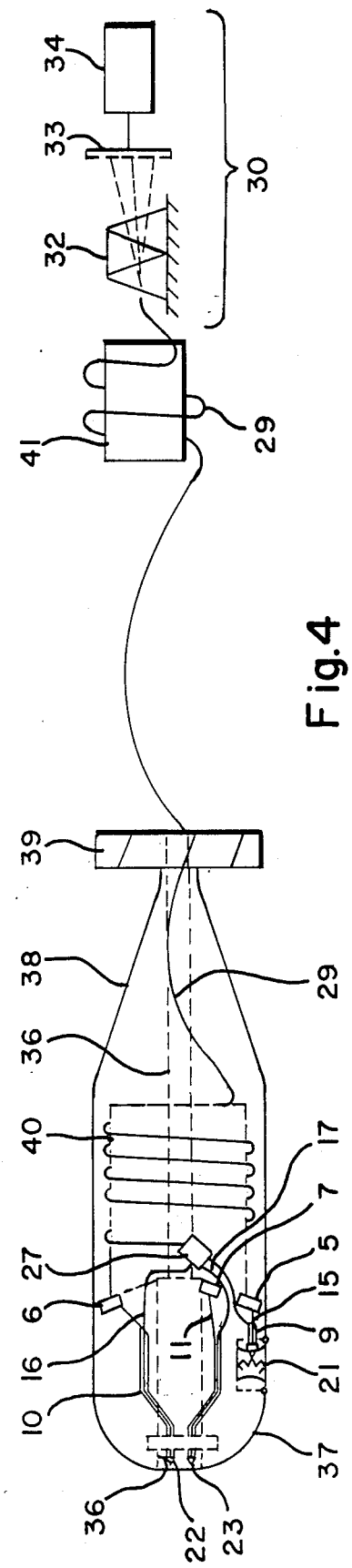
FIG. 4 is a schematic plan view of one presently preferred expendable embodiment of the probe and spectrograph of this invention.

An oceanographic configuration of immediate use for the first preferred embodiment of this invention is best shown in FIG. 4. We have a probe vehicle containing temperature, pressure, and index of refraction sensors coupled to optical fiber reeled upon a drum and then connected to a remote spectrograph detector. The probe vehicle 35 has a weighted Zinc forebody 37, plastic
afterbody 38, and a stabilizing ring 39. A ⅜" flushing hole 36 extends from the nose along the center line to the tail, within which is located the temperature sensor 22 and the index of refraction pressure sensor and diaphram 21 is located in at the skin of the probe vehicle between afterbody where the radius of curvature zero. The light emitting diodes (LEDs) light sources and batteries 5-7 are coupled to the sensors 21-23 by the first optical fiber waveguide means 9-11, and the sensors are coupled to the wavelength multiplexer 27 by the second optical fiber waveguide means 15-17. The third optical fiber waveguide means 29 couples the wavelength multiplexer with the spectrograph detector 30 and is coiled around reel 40 in the probe vehicle and reel 41 near the spectrograph detector 30. The detector 30 is located remotely, as for example on board an oceanographic vessel, and is comprised of a glass or rutile dispersing prism 32, a line scan photo detector camera 33, and a microprocessor 34. The diameter of the probe vehicle is approximately ¾" and its length is required to be greater than 11" to avoid resonant instabilities during its free-fall.

Figure 2:
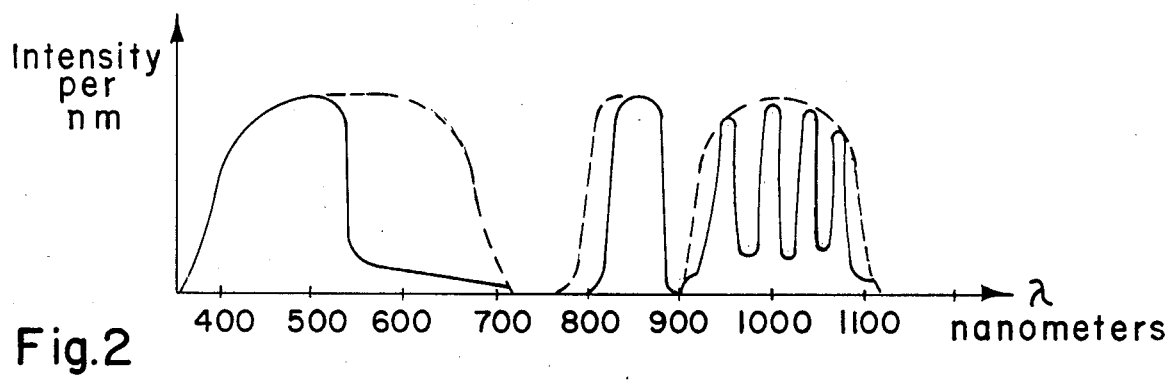
FIG. 2 is a graphical comparison between the spectral intensities and the wavelength for three light sources and the spectrograph detector output of FIG. 4.

The temperature sensor 22 is a selenium prism whose absorption/transmission band edge goes from 725 nm to 755 nm as the temperature goes from 0° C. to 30° C.; this requires red LEDs as light source 6. The pressure sensor 21 is a birefringent crystal or other photoelastic material, such as quartz or glass, whose output displays maximums and minimums in intensity as function of the wavelength of radiation and the applied pressure. The wavelength shift of the maximum/minimum band edge is about 60 nm as the pressure goes from atmospheric to that at 1000 meters depth in the ocean; this requires LEDs of the Gallium Aluminum Arsenide class in the 900 nm to 1100 nm emission range. The index of refraction sensor 23 is a glass retroreflecting prism whose sensing face forms an interface between the glass prism and the seawater. The sensing face is at the nominal critical angle for the incident radiant energy; the wavelength of the reflection/transmission band edge is measured and is a function of the seawater index of refraction. See my co-filed patent application, Seaver "REFRACTION SENSOR", filed on Apr. 3, 1985, Ser. No. 719,399 (U.S. Pat. No 4,699,511. As the radiant energy incident to the sensing face must be collimated, the light source 7 is coupled to the sensor 23 with a single mode fiber 11. A seawater index of refraction change of 0.0096 represents a shift in the reflection band edge from 400 nm to 700 nm and requires green-blue LEDs. FIG. 2 shows the spectral intensity outputs for the above described light sources (dotted lines) and sensors (solid lines).

The method for measuring the temperature, pressure, and index of refraction of a vertical section of the ocean with the above described instrument is to first deploy the probe into the ocean, as from a vessel on or in it. The gravity induced free-fall begins to unreel the optical fiber waveguide 29 contained with the probe vehicle, the sensed signal is conveyed back to the spectrograph detector, and the measurement begins. Values of pressure (which can be readily converted to depth,) temperature, and index of refraction are continuously recorded as the probe vehicle descends through the ocean. When the optical fiber waveguide 29 is completely unreeled from drum 40, the weight and motion of the probe nose 37 causes the optical fiber waveguide 29 to sever and the measurement is complete. Motion of the surface vessel is compensated for by also unreeling optical fiber waveguide 29 from drum 41 on board the ship during the measurement. Customarily the total time and depth of the measurement is 70 to 300 seconds and 500 meters to 2000 meters, respectively.

It is obvious that minor changes may be made in the form and construction of the afore described invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. An expendable measurement probe characterized by a combination of optical fibers and a plurality of remote optical sensors producing optical signals and each sensor having a band edge which is a function of a parameter, such as temperature, pressure, or index of refraction of the environment external to the sensors, such combination comprising:

a radiant energy path means comprising a first optical fiber waveguide means for each sensor, a second optical fiber waveguide means for each sensor, and a third optical fiber waveguide means being common to the signals from all sensors;

sensing means comprising radiant energy filters each of whose band edges occurs at different wavelengths, the band edge being the wavelength where an abrupt change in spectral intensity occurs, and each band edge being a function of a parameter, such as temperature, static pressure, time varying pressure, or the index of refraction of the environment external to the corresponding sensor, and each of the filters providing a direct or reflective path from said first waveguide means, through said sensing means, to said second waveguide means;

a multiplexer coupling all of said second waveguide means to said third waveguide means whereby the signals are reduced from a plurality to one;

a broad-band radiant energy source means optically coupled to each of said first optical fiber waveguide means;

detecting means optically coupled to said third optical fiber waveguide means for detecting the spectral intensities of the wavelengths of the radiant energy transmitted through each said sensing filter, the detecting means then correlating the wavelengths of the various band edges from each sensing filter to the desired measurement parameter of that sensing filter;

a probe vehicle of such a shape and weight so as to insure a predetermined and constant free-fall velocity and to avoid resonant instabilities when deployed into said environment;

wherein the third optical fiber waveguide means is long enough to permit remote sensing at distances corresponding to ocean depths of oceanographic interest, of the order of magnitude of kilometers, and;

wherein the sensing means is contained within said probe vehicle, a portion of the long third optical fiber waveguide means being also contained and spooled within said probe vehicle, and said portion of the third optical fiber waveguide means further capable of being unreeled during the deployment of said probe vehicle and severed upon completion of the deployment; said radiant energy source means, first, second, and third optical fiber waveguide means, multiplexer, and sensing means being expendable.

2. A probe as recited in claim 1, wherein the radiant energy source means comprises individual broad-band radiant energy sources, having band widths, respectively optically coupled to each of said first optical fiber waveguide means, the band width of each of said radiant energy sources particularly chosen to be suitable to the particular sensing filter in its optical path and chosen to be separate from the band widths of the other sensing filters, said bandwidths being of the order of 200 nanometers.

3. A probe as recited in claim 1, wherein a single broad-band radiant energy source means is optically coupled to a plurality of said first optical fiber waveguide means and thus coupled to the many sensing filters, said sensing filters then being coupled to said third optical fiber waveguide means by a time division multiplexer.

4. A probe as recited in claim 1, wherein the radiant energy source means is operable to emit radiant energy in the visible and/or the infrared region of the electromagnetic spectrum.

5. An expendable measurement probe characterized by a combination of optical fibers and a plurality of remote optical sensors producing optical signals and each sensor having a band edge which is a function of a parameter, such as temperature, pressure, or index of refraction of the environment external to the sensors, such combination comprising:

a radiant energy path means comprising a first optical fiber waveguide means for each sensor, a second optical fiber waveguide means for each sensor, and a third optical fiber waveguide means being common to the signals from all sensors;

sensing means comprising radiant energy filters each of whose band edges occurs at different wavelengths the band edge being the wavelength where an abrupt change in spectral intensity occurs, and each band edge being a function of a parameter, such as temperature, static pressure, time-varying pressure, or the index of refraction of the enviornment external to the corresponding sensor, and each of the filters providing a direct or reflective path from said first waveguide means, through said sensing means, to said second waveguide means;

a multiplexer coupling all of said second waveguide measn to said third waveguide means whereby the signals are reduced from a plurality to one;

a broad-band radiant energy source means optically coupled to each of said first optical fiber waveguide means;

detecting means optically coupled to said third optical fiber waveguide means for detecting the spectral intensities of the wavelengths of the radiant energy transmitted through each said sensing filter, the detecting means then correlating the wavelengths of the various band edges from each sensing filter to the desired measurement parameter of that sensing filter;

a probe vehicle of such a shape and weight so as to insure a predetermined and constant free-fall velocity and to avoid resonant instsabilities when deployed into said environment;

wherein the third optical fiber waveguide means is long enough to permit remote sensing at distance corresponding to ocean depths of oceanographic interest, of the order of magnitude of kilometers, and;

wherein the sensing means is contained within a weighted probe vehicle, a portion of the long third optical fiber waveguide means being also contained within said probe vehicle, and said portion of the third optical fiber waveguide means further capable of being unreeled during the deployment of said probe vehicle and severed upon completion of the depolyment; said radiant energy source means, first, second, and third optical fiber waveguide means, multiplexer, and sensing means being expendable, and wherein the radiant energy source means is a broadband incoherent and incandescent white light or Light Emitting Diodes of bandwidth chosen so as to provide continuous spectral radiant energy in bands located in the visible to infrared portion of the electromagnetic spectrum, the detecting means are composed of a dispersing prism or diffraction grating imaging the sensed signal onto a photodetecting device, and the sensing means are three band edge filters that operate in different regions of the electromagnetic spectrum, the sensors being, specifically, a static or time-varying pressure sensor making use of the change in birefiringence caused by pressure in photoelastic materials such as glass or quartz, a temperature sensor, and an index of refraction sensor making use of the change in the critical wavelength of reflection/refraction band edge with the external index of refraction in prismatic materials.

6. A probe as recited in claim 5, wherein the probe vehicle is buoyant in ocean water, and of a particular shape that permits it to rise at a predetermined and constant velocity.

7. A probe as recited in claim 5, wherein the probe vehicle is neutrally buoyant in ocean water, permitting it to remain at one depth, the depth corresponding to neutral buoyancy being adjustable.

8. A probe as recited in claim 5, wherein said temperature sensor makes use of the change in transmission-/absorption band edge with temperature in crystals.

9. A method for sensing temperature, pressure, and the index of refraction continuously in a vertical column in the ocean without the use of electrical wires, the method comprising:

fabricating temperature, pressure, and index of refraction sensors in the nature of filters from prismatic materials that have spectral band edges that are functions of the temperature, pressure, and the index of refraction, respectively, external to the sensors, and that are each prismatically configured to provide a direct or reflective path through said sensor, all of said sensors being located in a probe vehicle;

providing a broad-band incoherent radiant energy source bandwidth for each filter, each source bandwidth being approximately 200 nm, and being from the visible to infrared portion of the electromagnetic spectrum, each source bandwidth being preselected for each sensor and being exclusive to that filter;

optically coupling each radiant energy source to its respective filter with a first optical fiber waveguide, each of said filters causing throughput spectral intensities to abruptly decrease at a particular wavelength, the critical wavelength at the band edge, each critical wavelength changing respectively with the temperature, pressure or index of refraction external to its respective filter;

providing a detecting means capable of detecting the changes in intensities at the wavelengths of the throughput radiant energy and, thereby detecting the changes of the band edges of the radiant energy passed by the three sensors as a signal, said detecting means employing a prism or diffraction grating for projecting the signal on a suitable photo-detecting device and operating over the wavelength range of 400 nanometers to 2000 nanometers, said detecting means relating each band edge to the temperature, pressure, and index of refraction external to its respective sensing filter;

optically coupling each of the three sensors to a respective second optical fiber waveguide means, to a multiplexer, and thence to the detecting means by a third optical fiber waveguide means, said third optical fiber waveguide means being long enough to permit remote sensing at distances corresponding to ocean depths of oceanographic interest, of the order of magnitude of kilometers;

providing a probe vehicle of such a shape and weight so as to insure a pre-determined and constant free-fall or rise velocity deployed into the ocean, said vehicle initially containing a portion of said third optical fiber waveguide means on a reel and further containing said three filters adapted to measure temperature, pressure and index of refraction;

deploying the probe vehicle into the ocean from a vessel, the vessel movement being compensated for by the unreeling of another portion of the third optical waveguide means from a second reel on the vessel;

unreeling the third waveguide means as the probe vehicle falls or rises while measuring the temperature, pressure and index of refraction of the water column through the ocean; and severing the third waveguide means when the deployment is complete.

10. A method as recited in claim 9, in which wavelength division multiplexing is employed to couple the second optical fiber waveguide means to the third optical fiber waveguide means.

11. A method as recited in claim 9, wherein time division multiplexing is employed to couple the second optical fiber waveguide means to the third optical fiber waveguide means.

* * * * *